(12) United States Patent
Honma et al.

(10) Patent No.: US 12,163,441 B2
(45) Date of Patent: Dec. 10, 2024

(54) TURBOCHARGER

(71) Applicant: IHI Corporation, Tokyo (JP)

(72) Inventors: Tomohiro Honma, Tokyo (JP); Kenta Kawamitsu, Tokyo (JP); Yoshinari Yoshida, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 18/499,343

(22) Filed: Nov. 1, 2023

(65) Prior Publication Data
US 2024/0060431 A1    Feb. 22, 2024

Related U.S. Application Data

(63) Continuation of application No. PCT/JP2022/017383, filed on Apr. 8, 2022.

(30) Foreign Application Priority Data

Aug. 26, 2021   (JP) ................................. 2021-138212

(51) Int. Cl.
    *F01D 25/26*   (2006.01)
    *F02C 7/24*    (2006.01)
    *F04D 29/42*   (2006.01)

(52) U.S. Cl.
    CPC ............... *F01D 25/26* (2013.01); *F02C 7/24* (2013.01); *F04D 29/4206* (2013.01); *F05D 2220/40* (2013.01); *F05D 2240/14* (2013.01); *F05D 2260/231* (2013.01)

(58) Field of Classification Search
    CPC .. F01D 25/26; F02B 39/00; F02C 7/24; F04D 29/4206; F05D 2220/40; F05D 2240/14; F05D 2260/231
    See application file for complete search history.

(56) References Cited

U.S. PATENT DOCUMENTS

| | | | |
|---|---|---|---|
| 8,500,398 B1 * | 8/2013 | Walker, Jr. | F01D 25/26 415/177 |
| 9,518,501 B2 * | 12/2016 | Fischer | F16L 23/00 |
| 9,541,095 B2 * | 1/2017 | Mathey | F01D 9/026 |
| 9,677,453 B2 * | 6/2017 | Wegener | F01N 13/1844 |
| 9,841,033 B2 * | 12/2017 | Henke | F04D 29/4206 |
| 10,544,703 B2 * | 1/2020 | Azuma | F01D 9/026 |

(Continued)

FOREIGN PATENT DOCUMENTS

| | | |
|---|---|---|
| DE | 10 2017 215 591 A1 | 3/2019 |
| DE | 10 2018 105 827 A1 | 9/2019 |

(Continued)

OTHER PUBLICATIONS

International Search Report issued Jun. 28, 2022 in PCT/JP2022/017383 filed on Apr. 8, 2022, 3 pages.

*Primary Examiner* — Jesse S Bogue
(74) *Attorney, Agent, or Firm* — Oblon, McClelland, Maier & Neustadt, L.L.P.

(57) ABSTRACT

A turbocharger includes: a housing; a plurality of covers each of which encloses at least a part of an outer surface of the housing, the plurality of covers including at least a first cover and a second cover, each of the plurality of covers accommodating an insulator between the cover and the outer surface of the housing; and a connecting piece directly arranged on the outer surface of the housing and connecting the first cover and the second cover.

4 Claims, 4 Drawing Sheets

(56) References Cited

U.S. PATENT DOCUMENTS

| | | | |
|---|---|---|---|
| 11,035,254 B2* | 6/2021 | Azuma | F01D 25/24 |
| 11,306,610 B2* | 4/2022 | Okamoto | B08B 9/0321 |
| 11,421,556 B2* | 8/2022 | Aoyama | F01D 25/26 |
| 11,808,163 B2* | 11/2023 | Sugiura | F01D 25/14 |
| 2019/0226361 A1* | 7/2019 | Spatz | F02C 6/12 |
| 2020/0173308 A1 | 6/2020 | Oki et al. | |
| 2020/0392870 A1* | 12/2020 | Aoyama | F02B 39/00 |
| 2021/0010390 A1* | 1/2021 | Okamoto | F01D 25/26 |

FOREIGN PATENT DOCUMENTS

| | | |
|---|---|---|
| JP | 57-129928 U | 8/1982 |
| JP | 6-73337 U | 10/1994 |
| JP | 7-189725 A | 7/1995 |
| JP | 2016-14353 A | 1/2016 |
| JP | 2019-127944 A | 8/2019 |
| JP | 6639728 B1 | 2/2020 |
| JP | 2021-76077 A | 5/2021 |
| WO | WO 2016/010847 A1 | 1/2016 |

* cited by examiner

TURBOCHARGER

CROSS REFERENCE TO RELATED APPLICATIONS

This application is a continuation application of International Application No. PCT/JP2022/017383, filed on Apr. 8, 2022, which claims priority to Japanese Patent Application No. 2021-138212 filed on Aug. 26, 2021, the entire contents of which are incorporated herein by reference.

BACKGROUND ART

Technical Field

The present disclosure relates to a turbocharger.

A turbocharger may comprise an insulator to prevent a decrease in temperature of exhaust gas. For example, Patent Literature 1 discloses a turbocharger comprising an insulator between a cover surrounding a turbine housing of the turbocharger and an outer surface of the turbine housing. The cover has a substantially cylindrical shape and is divided into two parts along an axial direction. The two parts are joined to each other by welding.

CITATION LIST

Patent Literature

Patent Literature 1: JP 2021-76077 A

SUMMARY

Technical Problem

A housing of a turbocharger may have a variety of shapes. Accordingly, it may be difficult to attach a cover that accommodates an insulator to the housing, depending on the shape of the housing. Thus, it is desirable to develop a technique that can improve the attachment of the cover to the housing.

The purpose of the present disclosure is to provide a turbocharger that can improve the attachment of a cover to a housing, taking the above issue into consideration.

Solution to Problem

A turbocharger according to one aspect of the present disclosure includes: a housing; a plurality of covers each of which encloses at least a part of an outer surface of the housing, the plurality of covers including at least a first cover and a second cover, each of the plurality of covers accommodating an insulator between the cover and the outer surface of the housing; and a connecting piece directly arranged on the outer surface of the housing and connecting the first cover and the second cover.

The first cover, the second cover and the connecting piece may be made of the same metal.

The plurality of covers may be arranged along a circumferential direction of a shaft of the turbocharger and a gap may be provided between the first cover and the second cover in the circumferential direction, and the connecting piece may be arranged in the circumferential gap and the plurality of covers and the connecting piece may define a closed loop around the housing.

Effects of Disclosure

According to the present disclosure, the attachment of a cover to a housing can be improved.

DESCRIPTION OF EMBODIMENTS

An embodiment of the present disclosure will be described in detail below with reference to the accompanying drawings. Specific dimensions, materials, and numerical values described in the embodiment are merely examples for a better understanding, and do not limit the present disclosure unless otherwise specified. In this specification and the drawings, duplicate explanations are omitted for elements having substantially the same functions and configurations by assigning the same sign. Furthermore, elements not directly related to the present disclosure are omitted from the figures.

Figure 1:
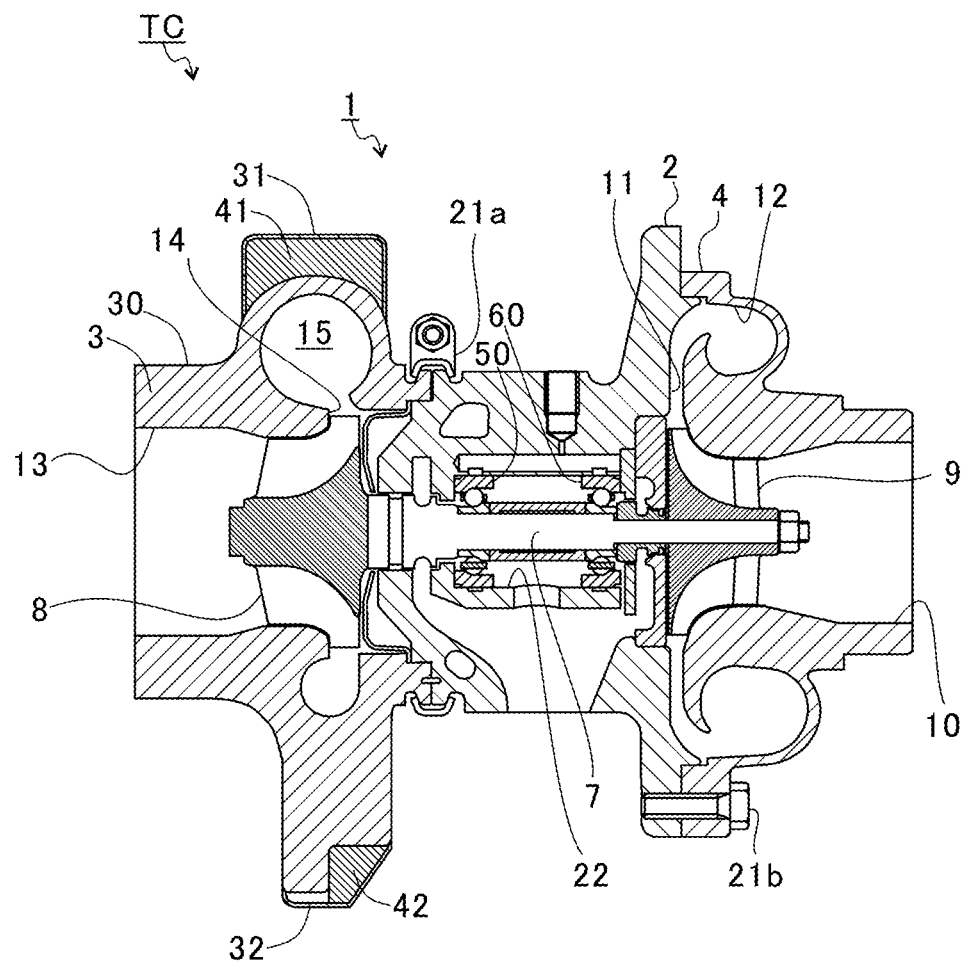
FIG. 1 is a schematic cross-sectional view of a turbocharger according to an embodiment.

FIG. 1 is a schematic cross-sectional view of a turbocharger TC according to an embodiment. For example, the turbocharger TC is applied to an engine. The turbocharger TC comprises a housing 1, a shaft 7, a turbine impeller 8, and a compressor impeller 9.

As described below, the turbine impeller 8 and the compressor impeller 9 rotate integrally with the shaft 7. Accordingly, a central axis direction, a radial direction, and a circumferential direction of the shaft 7 are common to the turbine impeller 8 and the compressor impeller 9. In the present disclosure, the central axis direction, the radial direction, and the circumferential direction of the shaft 7, the turbine impeller 8, and compressor impeller 9 may simply be referred to as the "central axis direction," the "radial direction," and the "circumferential direction," respectively, unless otherwise instructed.

The housing 1 includes a bearing housing 2, a turbine housing 3, and a compressor housing 4. In the central axis direction, one end of the bearing housing 2 is connected to the turbine housing 3 by a fastening mechanism 21a such as a G-coupling. In the central axis direction, the other end of the bearing housing 2 is connected to the compressor housing 4 by a fastening mechanism 21b such as a fastening bolt. For example, the bearing housing 2, the turbine housing 3 and the compressor housing 4 are made of cast iron.

A plurality of covers 31, 32 and 33 are attached to the turbine housing 3. Note that the cover 33 is not shown in FIG. 1. In the present disclosure, the covers 31, 32 and 33 can also be referred to as an "insulator cover." The covers 31 and 32 accommodate insulators 41 and 42 between the covers 31 and 32 and an outer surface 30 of the turbine housing 3. The covers 31, 32 and 33 are described in detail below.

The bearing housing 2 includes a bearing hole 22. The bearing hole 22 extends in the central axis direction in the bearing housing 2. The bearing hole 22 accommodates a pair of rolling bearings 50 and 60. The rolling bearings 50 and 60 rotatably support the shaft 7. The pair of rolling bearings 50 and 60 are spaced apart from each other in the central axis direction.

The turbine impeller 8 is provided at a first end of the shaft 7 in the central axis direction. The turbine impeller 8 rotates integrally with the shaft 7. The turbine impeller 8 is rotatably accommodated in the turbine housing 3. The compressor impeller 9 is provided at a second end opposite to the first end of the shaft 7 in the central axis direction. The compressor impeller 9 rotates integrally with the shaft 7. The compressor impeller 9 is rotatably accommodated in the compressor housing 4.

The compressor housing 4 includes an inlet 10 at an end opposite to the bearing housing 2 in the central axis direction. The inlet 10 is connected to an air cleaner (not shown). The bearing housing 2 and the compressor housing 4 define a diffuser flow path 11 therebetween. The diffuser flow path 11 extends from a radially inner side to an outer side. The diffuser flow path 11 has an annular shape. The diffuser flow path 11 is connected to the inlet 10 via the compressor impeller 9.

The compressor housing 4 includes a compressor scroll flow path 12. The compressor scroll flow path 12 is located radially outside the diffuser flow path 11. The compressor scroll flow path 12 is connected to the diffuser flow path 11. The compressor scroll flow path 12 is also connected to an intake port of an engine (not shown).

In the compressor housing 4 as described above, when the compressor impeller 9 rotates, air is sucked into the compressor housing 4 from the inlet 10. The sucked air is accelerated by centrifugal force while passing through spaces between blades of the compressor impeller 9. The accelerated air is pressurized in the diffuser flow path 11 and the compressor scroll flow path 12. The pressurized air flows out of an outlet (not shown), and is directed to the intake port of the engine.

The turbine housing 3 includes an outlet 13 at an end opposite to the bearing housing 2 in the central axis direction. The outlet 13 is connected to an exhaust gas purifier (not shown). The turbine housing 3 includes a connecting flow path 14. The connecting flow path 14 extends from the radially inner side to the outer side. The connecting flow path 14 has an annular shape. The connecting flow path 14 is connected to the outlet 13 via the turbine impeller 8.

The turbine housing 3 includes a turbine scroll flow path 15. The turbine scroll flow path 15 is located radially outside the connecting flow path 14. The turbine scroll flow path 15 is connected to the connecting flow path 14. The turbine scroll flow path 15 is also connected to an gas inlet (not shown). The gas inlet receives exhaust gas discharged from an exhaust manifold of the engine (not shown).

In the turbine housing 3 as described above, the exhaust gas is directed from the gas inlet to the turbine scroll flow path 15, and then through the connecting flow path 14 and turbine impeller 8 to the outlet 13. The exhaust gas rotates the turbine impeller 8 while passing through spaces between blades of the turbine impeller 8. The rotational force of the turbine impeller 8 is transmitted to the compressor impeller 9 via the shaft 7. As the compressor impeller 9 rotates, the air is pressurized as described above. As such, the pressurized air is directed to the intake port of the engine.

Next, the covers 31, 32 and 33 will be described.

Figure 2:
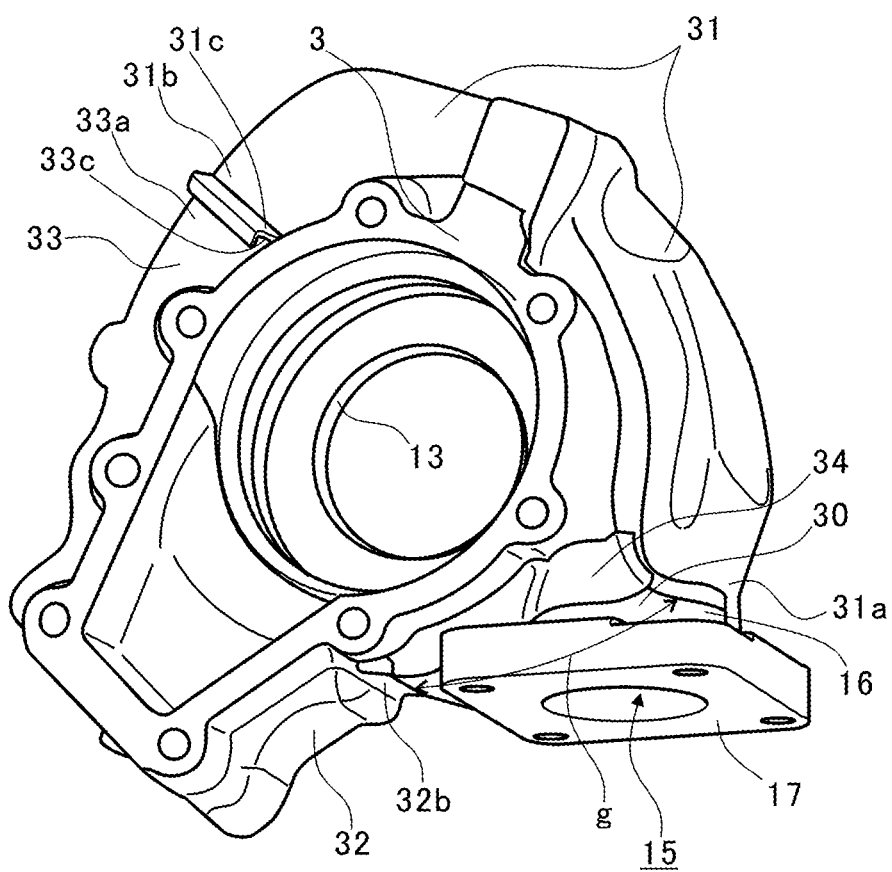
FIG. 2 is a perspective view showing a turbine housing along with covers.
Figure 3:
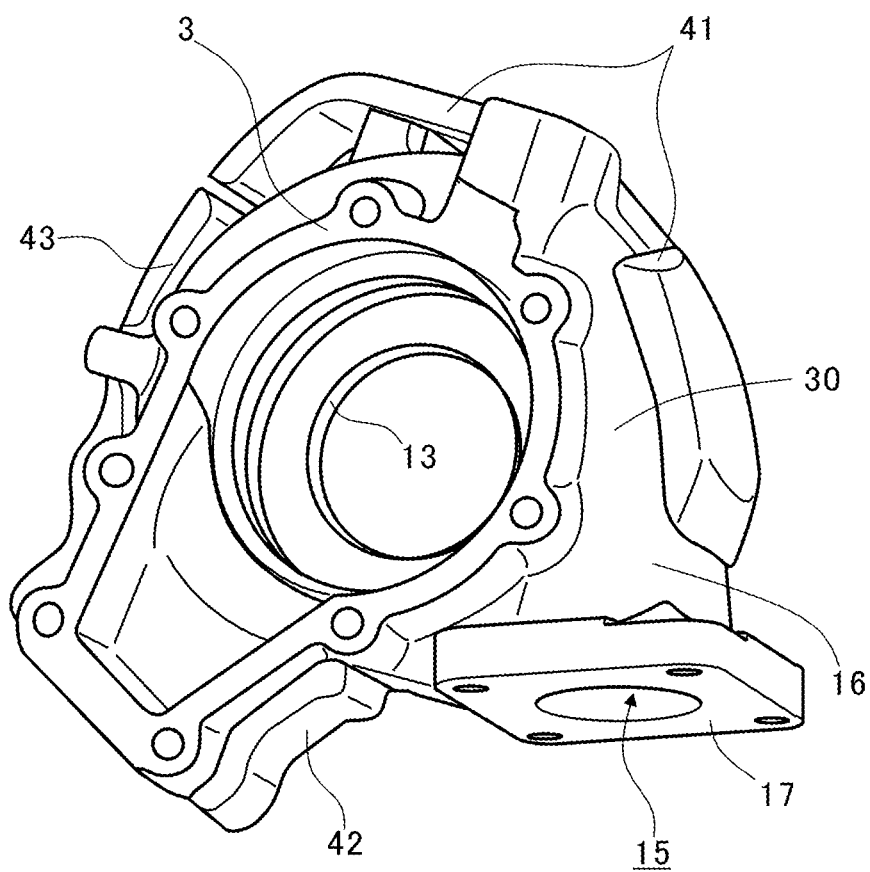
FIG. 3 is a perspective view showing the turbine housing without the covers.

FIG. 2 is a perspective view showing the turbine housing 3 along with the covers 31, 32 and 33, and shows an inside of the turbine housing 3, i.e., a side facing the bearing housing 2. FIG. 3 is a perspective view showing the turbine housing 3 without the covers 31, 32 and 33, and shows the turbine housing 3 from the same direction as FIG. 2.

Referring to FIG. 2, the plurality of covers 31, 32 and 33 are attached to the turbine housing 3 as described above. In the present embodiment, three covers 31, 32 and 33 are attached to the turbine housing 3. In other embodiments, more or fewer than three covers may be attached to the turbine housing 3.

The covers 31, 32 and 33 enclose the turbine housing 3 in the circumferential direction. Specifically, the covers 31, 32 and 33 enclose the turbine housing 3 along a contour of the turbine housing 3 that is farthest from the central axis in the radial direction. The covers 31, 32 and 33 are divided from each other in the circumferential direction. In other embodiments, for example, the covers may be divided from each other in the central axis direction.

Referring to FIG. 1, each of the covers 31, 32 and 33 has a space between the outer surface 30 of the turbine housing 3 and the respective cover 31, 32, 33. As mentioned above, the cover 33 is not shown in FIG. 1. The cover 31 accommodates an insulator 41 in the space between the cover 31 and the outer surface 30 of the turbine housing 3. The cover 32 also accommodates an insulator 42 in the space between the cover 32 and the outer surface 30 of the turbine housing 3. Furthermore, referring to FIGS. 2 and 3, the cover 33 (FIG. 2) accommodates an insulator 43 (FIG. 3) in the space between the cover 33 and the outer surface 30 of the turbine housing 3. For example, the insulators 41, 42 and 43 may be formed by a material including silica fibers and a binder. The material of the insulators 41, 42 and 43 is not limited thereto, and other materials may be used. For example, the insulators 41, 42 and 43 may be fixed to inner surfaces of the covers 31, 32 and 33, or to the outer surface of the turbine housing 3.

Figure 4:
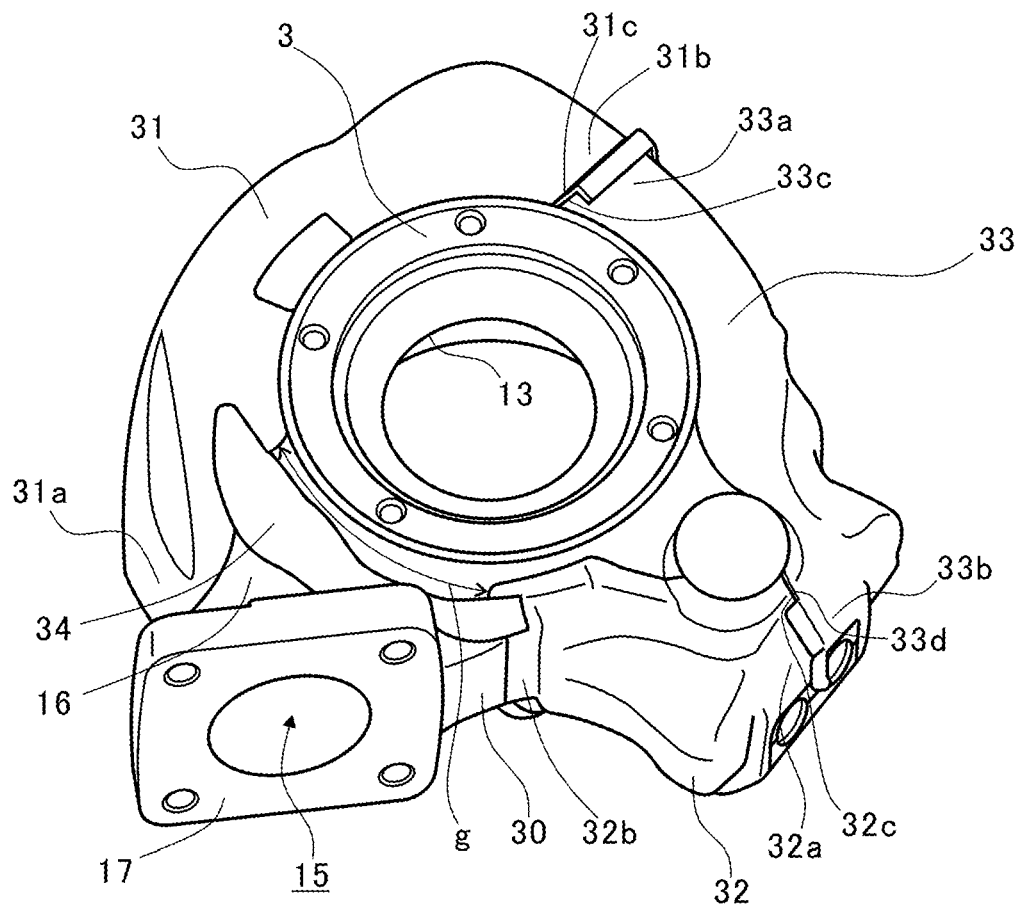
FIG. 4 is a perspective view seen from another direction and showing the turbine housing along with the covers.

FIG. 4 is a perspective view seen from another direction and showing the turbine housing 3 along with the covers 31, 32 and 33, and shows an outside of the turbine housing 3. In other words, FIG. 4 shows the turbine housing 3 from the opposite direction to FIG. 2. The first cover 31 includes a first end 31a and a second end 31b in the circumferential direction. The second cover 32 includes a first end 32a and a second end 32b in the circumferential direction. The third cover 33 includes a first end 33a and a second end 33b in the circumferential direction.

The first cover 31 includes a flange 31c at the second end 31b. The flange 31c protrudes away from the outer surface 30 of the turbine housing 3, and is further bent substantially perpendicular to the protruding direction. For example, the flange 31c is provided along an edge of the second end 31b of the first cover 31. The third cover 33 also includes a flange 33c at the first end 33a. The flange 33c has a shape corresponding to the flange 31c. In other words, the flange 33c protrudes away from the outer surface of the turbine housing 3, and is further bent substantially perpendicular to the protruding direction. For example, the flange 33c is provided along an edge of the first end 33a of the third cover 33. In the present embodiment, the first cover 31 and the third cover 33 are made of the same metal, e.g., stainless steel, and the flange 31c and the flange 33c are fixed to each other by welding. The means of fixing the flange 31c and the flange 33c is not limited to welding, and other fixing means such as a bolt, a wire or a hook may be used, for example.

The second cover 32 includes a flange 32c at the first end 32a. The flange 32c protrudes away from the outer surface 30 of the turbine housing 3, and is further bent substantially perpendicular to the protruding direction. For example, the flange 32c is provided along an edge of the first end 32a of the second cover 32. The third cover 33 also includes a flange 33d at the second end 33b. The flange 33d has a shape corresponding to the flange 32c. In other words, the flange 33d protrudes away from the outer surface of the turbine housing 3, and is further bent substantially perpendicular to the protruding direction. For example, the flange 33d is provided along an edge of the second end 33b of the third cover 33. In the present embodiment, the second cover 32 and the third cover 33 are made of the same metal, e.g., stainless steel, and the flange 32c and the flange 33d are fixed to each other by welding. The means of fixing the flange 32c and the flange 33d is not limited to welding, and other fixing means may be used.

As described above, the first cover 31 and the third cover 33 are arranged continuously in the circumferential direction, and are directly fixed to each other by the flange 31c and the flange 33c. Similarly, the second cover 32 and the third cover 33 are arranged continuously in the circumferential direction, and are directly fixed to each other by the flange 32c and the flange 33d. However, the turbine housing 3 includes a scroll wall 16 that defines the turbine scroll flow path 15. Furthermore, the scroll wall 16 is also provided with a flange 17. In the present embodiment, due to the positions of the scroll wall 16 and the flange 17, it is difficult to arrange the first cover 31 and the second cover 32 continuously in the circumferential direction. Accordingly, the first cover 31 and the second cover 32 have a gap g in the circumferential direction between the first end 31a of the first cover 31 and the second end 32b of the second cover 32. The first end 31a of the first cover 31 and the second end 32b of the second cover 32 are indirectly connected to each other by connecting pieces 34 that bridge the gap g.

Referring to FIGS. 2 and 4, in the present embodiment, two connecting pieces 34 are used. In other embodiments, only one connecting piece 34 may be used, or three or more connecting pieces 34 may be used. The two connecting pieces 34 are placed across the turbine scroll flow path 15 on both faces of the turbine housing 3 in the central axis direction, e.g., on both faces of the scroll wall 16. One end of each connecting piece 34 is connected to the first end 31a of the first cover 31, and the other end is connected to the second end 32b of the second cover 32. In the present embodiment, the connecting pieces 34 are made of the same metal as those of the first cover 31 and the second cover 32, e.g., stainless steel, and are fixed to the first cover 31 and the second cover 32 by welding. The means of fixing the connecting pieces 34 to the first cover 31 and the second cover 32 is not limited to welding, and other fixing means such as a bolt, a wire or a hook may be used, for example.

The connecting pieces 34 are arranged directly on the outer surface 30 of the turbine housing 3. In other words, the connecting pieces 34 do not accommodate the insulator 41. In another aspect, the connecting pieces 34 are only used to bridge the first cover 31 and the second cover 32. For example, the connecting pieces 34 may be in contact with the outer surface 30 of the turbine housing 3, or may be non-contact with the outer surface 30, or may be partially in contact with the outer surface 30.

As described above, the covers 31, 32 and 33 and the connecting pieces 34 are connected to each other in the circumferential direction, and define a closed loop around the turbine housing 3. Accordingly, the covers 31, 32 and 33 and the connecting pieces 34 can tightly wrap around the turbine housing 3, which allows the covers 31, 32 and 33 to be firmly fixed to the turbine housing 3.

Note that in the present embodiment, each of the covers 31, 32 and 33 is fixed directly to the outer surface of the turbine housing 3 by spot welding, in addition to wrapping around the turbine housing 3 by the covers 31, 32 and 33 and the connecting pieces 34 as described above. The connecting pieces 34 may likewise be directly fixed to the outer surface 30 of the turbine housing 3 by spot welding. However, the outer surface 30 of the turbine housing 3 includes a cast surface. In such a case where the covers 31, 32 and 33 are spot welded to the cast surface, the spot welds may be less strong. Therefore, when the turbocharger TC is repeatedly subjected to thermal stress through long-term use, the spot welds may peel off from the outer surface 30 of the turbocharger housing 3. However, In the present embodiment, the covers 31, 32 and 33 and the connecting pieces 34 define the closed loop around the turbine housing 3, so that the covers 31, 32 and 33 and the connecting piece 34 remain fixed to the turbine housing 3, even if the spot welds to the casting surface peel off.

As described above, the turbocharger TC comprises the turbine housing 3, the plurality of covers 31, 32 and 33 each of which encloses at least a part of the outer surface of the turbine housing 3, the plurality of covers 31, 32 and 33 including at least a first cover 31 and a second cover 32, each of the plurality of covers 31, 32 and 33 accommodating the insulator 41, 42, 43 between the cover 31, 32, 33 and the outer surface 30 of the turbine housing 3, and the connecting pieces 34 arranged directly on the outer surface 30 of the turbine housing 3 and connecting the first cover 31 and the second cover 32. According to such a configuration, the first cover 31 and the second cover 32 can be bridged by the connecting pieces 34 that are only used for connection, even in the case where the first cover 31 and the second cover 32 cannot be continuously arranged due to the shape of the turbine housing 3. Thus, for example, even in the case where the shape of the turbine housing 3 is complex, the connecting pieces 34 can hold the plurality of covers together. As such, the attachment of the covers 31, 32 and 33 to the turbine housing 3 can be improved.

Furthermore, in the turbocharger TC, the first cover 31, the second cover 32 and the connecting pieces 34 are made of the same metal. Therefore, even when the turbocharger TC is repeatedly exposed to thermal stress, the first cover 31, the second cover 32 and the connecting pieces 34 can follow thermal expansion. Thus, loosening of the first cover 31, the second cover 32 and the connecting pieces 34 attached to the turbine housing 3 can be curbed. Furthermore, when the first cover 31, the second cover 32 and the connecting pieces 34 are connected by welding, the strength of the weld can be improved.

Furthermore, in the turbocharger TC, the plurality of covers 31, 32 and 33 are arranged along the circumferential direction of the shaft 7 of the turbocharger TC, a gap g is provided between the first cover 31 and the second cover 32 in the circumferential direction, the connecting pieces 34 are arranged in the gap g, and the plurality of covers 31, 32 and 33 and the connecting pieces 34 define the closed loop around the turbine housing 3. According to such a configuration, the covers 31, 32 and 33 and the connecting pieces 34 can tightly wrap around the turbine housing 3, thereby firmly fixing the covers 31, 32 and 33 to the turbine housing 3. Furthermore, since the closed loop is defined around the turbine housing 3 by the plurality of covers 31, 32 and 33 and the connecting pieces 34, the covers 31, 32 and 33 and the connecting pieces 34 can remain fixed to the turbine housing 3, even if, for example, the spot welds to the cast surface peel off.

Although the embodiment of the present disclosure has been described above with reference to the accompanying drawings, the present disclosure is not limited thereto. It is obvious that a person skilled in the art can conceive of various examples of variations or modifications within the scope of the claims, which are also understood to belong to the technical scope of the present disclosure.

For example, in the embodiment described above, the connecting pieces 34 are applied to the covers 31 and 32 that are attached to the turbine housing 3. Additionally or alternatively, however, in other embodiments, the connecting piece may be applied to covers attached to the compressor housing 4 (not shown). In this case, the connecting piece is directly arranged on an outer surface of the compressor housing 4, while insulators are accommodated between the covers and the outer surface of the compressor housing 4.

What is claimed is:

1. A turbocharger comprising:
    a housing;
    a plurality of covers each of which encloses at least a part of an outer surface of the housing, the plurality of covers including at least a first cover and a second cover, each of the plurality of covers accommodating an insulator between the cover and the outer surface of the housing; and
    a connecting piece directly arranged on the outer surface of the housing without the insulator and connecting the first cover and the second cover, wherein an inner surface of the connecting piece directly contacts each of the first cover, the second cover and the outer surface of the housing,
    wherein the insulator is fixed to an inner surface of each of the plurality of covers or to the outer surface of the housing.

2. The turbocharger according to claim 1, wherein the first cover, the second cover and the connecting piece are made of the same metal.

3. The turbocharger according to claim 1,
    wherein the plurality of covers are arranged along a circumferential direction of a shaft of the turbocharger and a gap is provided between the first cover and the second cover in the circumferential direction, and
    the connecting piece is arranged in the circumferential gap and the plurality of covers and the connecting piece define a closed loop around the housing.

4. The turbocharger according to claim 2,
    wherein the plurality of covers are arranged along a circumferential direction of a shaft of the turbocharger and a gap is provided between the first cover and the second cover in the circumferential direction, and
    the connecting piece is arranged in the circumferential gap and the plurality of covers and the connecting piece define a closed loop around the housing.

* * * * *